United States Patent
Lowe et al.

(10) Patent No.: US 8,107,668 B2
(45) Date of Patent: Jan. 31, 2012

(54) DIGITAL DIFFERENTIAL WATERMARK AND METHOD

(75) Inventors: Steven A. Lowe, Hixon, TN (US); Eric L. Ingram, Pensacola, FL (US); Ed Patterson, Huntersville, NC (US)

(73) Assignee: Cryptodyne Systems, Inc., Orange Park, FL (US)

( * ) Notice: Subject to any disclaimer, the term of this patent is extended or adjusted under 35 U.S.C. 154(b) by 1058 days.

(21) Appl. No.: 11/685,836

(22) Filed: Mar. 14, 2007

(65) Prior Publication Data

US 2007/0217649 A1    Sep. 20, 2007

Related U.S. Application Data

(60) Provisional application No. 60/767,284, filed on Mar. 15, 2006.

(51) Int. Cl.
*G06K 9/00* (2006.01)
*G06K 9/36* (2006.01)
*G06K 9/46* (2006.01)
*H04N 7/167* (2011.01)

(52) U.S. Cl. ........ 382/100; 382/207; 382/232; 382/233; 380/201; 380/202; 380/236

(58) Field of Classification Search .................. None
See application file for complete search history.

(56) References Cited

U.S. PATENT DOCUMENTS

| | | | |
|---|---|---|---|
| 6,404,898 B1 | 6/2002 | Rhoades | |
| 6,571,144 B1 | 5/2003 | Moses et al. | |
| 6,675,146 B2 | 1/2004 | Rhoades | |
| 6,973,574 B2 * | 12/2005 | Mihcak et al. | 713/180 |
| 6,983,057 B1 | 1/2006 | Ho et al. | |
| 7,106,862 B1 * | 9/2006 | Blair et al. | 380/256 |
| 2004/0139324 A1 * | 7/2004 | Shin et al. | 713/176 |
| 2005/0203852 A1 * | 9/2005 | Okamoto | 705/51 |
| 2006/0079205 A1 * | 4/2006 | Semple et al. | 455/411 |

FOREIGN PATENT DOCUMENTS

WO      WO 01/29691 A1    4/2001

OTHER PUBLICATIONS

Wong et al. ("Data hiding and watermarking in JPEG compressed domain by DC coefficient modification", Proc. SPIE Security and Watermarking of Multimedia Contents, 2000, pp. 1-8).*
Hsu, Chiou-Ting et al., "Multiresolution Watermarking for Digital Images," IEEE Transactions on Circuits and Systems-II: Analog and Digital Signal Processing, Aug. 1998, p. 10971101, vol. 45, No. 8, IEEE.

* cited by examiner

*Primary Examiner* — Tom Y Lu
*Assistant Examiner* — Thomas Conway
(74) *Attorney, Agent, or Firm* — Robert R Deleault, Esq.; Mesmer & Deleault, PLLC

(57) ABSTRACT

A digital differential steganographic system and method includes a master key that is generated from an unmarked media, a mark-point reservoir created from the unmarked media and containing a set of viable candidate mark points for the unmarked media, and a mark-point applicator to insert data into the unmarked media at selected mark-points chosen from the mark-point reservoir creating a digital watermark. The method includes using an original unmarked media, shaping and testing marks in the original media for predictable distortion, verifying embedded marks at point of insertion in the original media, minimizing mark energy and duration for least-perceptible change, and using non-distributed, unmarked media of the original media as a master key.

8 Claims, 5 Drawing Sheets

DIGITAL DIFFERENTIAL WATERMARK AND METHOD

This application claims the benefit of U.S. Provisional Patent Application No. 60/767,284, filed Mar. 15, 2006.

BACKGROUND OF THE INVENTION

1. Field of the Invention

The present invention relates generally to the field of digital steganography. Particularly, the present invention relates to a process for embedding digital information into a lossy compression medium.

2. Description of the Prior Art

Digital steganography is the art of inconspicuously hiding data within data. Simply put, it is a digital watermark. Steganography's goal in general is to hide data well enough that unintended recipients do not suspect the steganographic medium of containing hidden data. Steganography and data hiding are not new concepts. It is believed that steganography was first practiced during the Golden Age in Greece. An ancient Greek record describes the practice of melting wax off wax tablets used for writing messages and then inscribing a message in the underlying wood. The wax was then reapplied to the wood, giving the appearance of a new, unused tablet. The resulting unused tablets could be innocently transported without anyone suspecting the presence of a message beneath the wax.

Steganography should not be confused with encryption. They are not the same and, therefore, they are used to achieve separate goals. Encryption is used to encode data such that an unintended recipient cannot determine its intended meaning. The purpose of steganography is not to keep others from knowing the hidden information. Steganography does not alter data to make it unusable to an unintended recipient. It is to keep others from thinking that the information even exists.

The amount of data that can be effectively hidden in a given medium tends to be restricted by the size of the medium itself. Ordering data that does not have an ordering constraint is often an effective method of steganography. Each permutation of a set of objects can be mapped to a positive integer. This mapping can then be used to encode hidden data by altering the order of objects that are not considered ordered by the carrier medium. While this technique generally does not change the information quality, hidden data can easily be lost if the medium is encoded again. More simply, this encoding of data is a digital watermark.

Typically, the watermark data is used to show authenticity or ownership of the other data, but it may also be a hidden message unrelated to the underlying carrier media. Digital audio watermarks, for example, are typically used to authenticate audio data copyright and distribution ownership. To preserve audio fidelity, such watermarks should be invisible to inspection, inaudible to the ear, robust against attacks and transformations, and easily provable. Embedded identifying watermarks may also be used to track patterns of distribution of media over electronic networks.

Prior art digital watermarking techniques can be sorted into categories from weakest to strongest. The weakest are non-audio watermarks. An example of this type of watermark is the use of data frames in an mp3 file, which do not affect the audio but are easily removed. The next type is classified as fragile watermarks. These use techniques like least-significant-bit (LSB) alteration, which is easily perturbed by decoding/recoding. Noise-based watermarks are stronger than the fragile watermarks. These use pseudorandom noise patterns to embed data, which require probabilistic recognition. The next stronger category are key-based or algorithmic watermarks. These types of watermarks rely on a key-path or algorithmic path to map out the locations and/or order of embedded information. The embedded information is unrecoverable without knowing the key or easily broken unless the algorithm is known. The strongest category to date is the spread-spectrum watermark. This category hides the data in many seemingly random frequency bins, which is just a specialized mark-construction technique that may be used with a key or algorithm.

There are problems with these methods. Key management can become very complex, especially if a unique key must be created for every individual marked file. Keeping track of the keys is not only difficult, but also finding the right key for a particular file without external information can be problematic. Probabilistic proof/detection for recognition of watermark data lacks certainty, i.e. probabilistic detectors can be wrong. They may introduce significant noise into the media. Many of these methods are already cracked or bypassed in the market and thus rendered useless for practical purposes. None of these methods are robust against all common attacks and transformations, especially cycles of decompression and recompression.

Several techniques have been devised for digital watermarks in audio applications. U.S. Pat. No. 6,675,146 (2004, Rhoads) discloses an audio steganographic method. The process uses two carrier bands to encode watermarking data in an audio file and to change sample values in the file. U.S. Pat. No. 6,571,144 (2003, Moses et al.) discloses a system for providing a digital watermark in an audio signal. The process describes using seven critical bands, each of which contains two carrier frequencies for 0 and 1 encoding using modulated noise. Neither the Rhoads process nor the Moses et al. process would survive lossy compression.

The strongest watermarking techniques currently used for digital-rights management applications are both noise-based and probabilistic. They also require altered hardware and/or software to use the marked files. This limits control over the exposure of the precise coding mechanism being used, which may subject the coding mechanism to reverse-engineering and eventual defeat. As an identification method, this form of digital-rights management suffers from its lack of certainty in recognition.

Therefore, what is needed is a steganographic system that is difficult to bypass even if the method is known. What is further needed is a steganographic system that is robust against common attacks and transformations, including decompression and recompression. What is also needed is a steganographic system that introduces minimal noise into the media.

SUMMARY OF THE INVENTION

It is an object of the present invention to provide a steganographic system that is difficult to bypass even if the method is known. It is another object of the present invention to provide a steganographic system that is robust against common attacks and transformations, including decompression and recompression. It is a further object of the present invention to provide a steganographic system that introduces minimal noise into the media.

The present invention achieves these and other objectives by providing a digital differential watermarking method that uses deterministic recognition and secured, secret natural master keys that provides near-absolute certainty when used as an identification or authentication method. Specifically, the present invention includes using the original media as a natural master key, shaping and testing marks for predictable distortion, verifying embedded marks at points of insertion, minimizing mark energy and duration for least-perceptible change, using non-distributed unmarked media as master key (master key is original media or is derived from original media). A subset of the media may be targeted and/or non-interfering marks may be interlaced or even overlaid. The present invention also eliminates the need for special software or hardware to use the marked media.

More specifically, the digital differential watermarking system of the present invention includes a master key, a mark-point reservoir and a mark-point applicator. The master key is generated from an unmarked media. The mark-point reservoir is created from the unmarked media and contains a set of viable candidate mark points for the unmarked media. The mark-point applicator inserts data into the unmarked media at selected mark-points chosen from the mark-point reservoir to create a marked (i.e. watermarked) media. The system also includes a compression/decompression module, a differentiation module, a mark-point selector module, a mark analyzer module, a mark verifier module, and a detect and decode module. It should be understood that the above-described modules may be separate software modules that are independent programs or part of a integrated software package.

The compression/decompression module is used to compress and decompress the media. The differentiation module compares the master key to a marked media to obtain the embedded data. The mark-point selector module selects a plurality of viable candidate mark points from the mark-point reservoir. The mark analyzer module analyzes the mark points that have survived the compression/decompression process and updates the mark-point reservoir to contain only those mark points that are usable in the present invention. The mark verifier module conducts a further sorting of viable mark points by verifying the integrity/distortion of the usable mark points. The detect and decode module compares a marked media containing the embedded data as the watermark to the master key/reference surface of the unmarked media and decodes the data, which then confirms whether the media originated from the source that originally provided the marked media.

More specifically the system of the present invention includes preparing a reference media from the original target media to account for incidental distortion of the encoding mechanism, building a map of the reference media to create a mark-point reservoir, selecting and organizing the marks from the mark-point reservoir to encode the given data (that is intended to be embedded in the target media) using a representational scheme, and applying the selected marks to the original, unmarked media. The marked media can then be compressed and decompressed without degrading the digital watermark. Marked media can then be compared to the reference media.

The reference media or reference surface is prepared from an original, unmarked media. The original unmarked media is compressed to provide an unmarked compressed media. The unmarked compressed media is decompressed and it is this unmarked, decompressed media that serves as the reference surface since the mark-points that are present after the compression-decompression process indicate these mark-points are probably robust enough for the digital differential watermarking system of the present invention.

The map of the reference media is created by generating a set of candidate marks based on peak-frequency or other appropriate analysis of the target media. This generated set of candidate marks forms a mark-point reservoir for the original media. A set of trial mark points is selected from the generated set of candidate marks and applied to the reference media creating a marked media. The marked media is cycled through a compression process then a decompression process (i.e. lossy compression/decompression). The decompressed marked media is then compared to the reference surface. The difference between the decompressed marked media and the reference surface shows which trial mark points survived the compression/decompression process. These trial mark points are then used to update the set of candidate marks in the mark-point reservoir. This cycle is performed for a given media to develop a set of reliable candidate marks available in the media for implanting a digital watermark in the media. Now that a reliable map of candidate marks has been developed, data can then be embedded into the original media to mark and verify the media.

A mark-point selector then selects a given set of mark points for the media from the mark-point reservoir and combines the data to be embedded with the set of selected mark points. The selected mark-points and data are then applied to the media to form a marked media. The marked media is then cycled through a compression-decompression cycle. The decompressed marked media is compared to the reference surface. The difference is analyzed to determine the data/marks originally applied to the media, i.e. the detected marks. The detected marks are then compared/verified to the selected mark points chosen prior to them being applied to the original unmarked media. This is a reliability check of the selected mark-points after undergoing the compression/decompression process for the media, which confirms that the digital watermark for the selected media will survive multiple compression and decompression cycles. It should be noted that the reservoir of potential marks may be larger than the minimum number of mark-points necessary to achieve a certain bit rate for the embedded data-stream. This allows the marking method to choose randomly among suitable mark points so that the method is more resilient to certain forms of attack such as combining multiple files with the same embedded data.

After verification that the embedded data in the media used as the digital watermark survives the lossy compression-decompression, the digital watermark can now be reliably used in steganographic applications for the selected media such as, for example, accountability and tracking of digital media, security authentication, and the like.

During the process of trial mark point determination, it was discovered that the splashes/marks fell into one of five categories. These categories include fragile, robust, reinforcing, interfering, or destructively degrading. Except for "fragile" mark points that do not present good survivability when undergoing compression and decompression and, thus, are not preferred for use in a "watermark," any of the remaining types may be used. It was further discovered that one category of splashes/marks provided an additional benefit when methods were used to remove the "watermark" splashes/marks in an attempt to circumvent the steganographic technique, which methods typically damage the splashes/marks so that the "watermark" is destroyed. When "destructively degrading" splashes/marks from the mark point reservoir were used, the method used to remove the "watermark" splashes/marks also rendered the media useless. Using substantially all or a significant number of "destructively degrading" splashes/marks for the "watermark" in the media will make the present invention's steganographic method more resistant to attack.

It should be noted that the digital "watermark" is repeated as many times as possible in the marked media. Consequently, often a small fragment of the marked media such as, for example, a song, is all that is required to read the entire segment of encoded data.

In more general terms, the present invention exploits the mathematical properties of the psychoacoustic model for encoding such as, for example, mp3 encoding, to implement a predictive marking scheme. The marking scheme uses the internal state of the encoder, the audio input at each time-point, and the psychoacoustic variables to predict the best location and wave-shape for marks so as to optimize surviv-ability and/or self-destruction when the output is subjected to repeated compression and decompression cycles.

It is intended that the present invention creates a unified psychoacoustic mathematical model which covers all known/popular codecs such as, for example, mp3 codecs. In other words, a "one-size-fits-all" solution so that the same mechanism works with all variants of audio compression such as lossy compression. In the event that a unified psychoacoustic mathematical model is not practical, then the present invention can isolate a model for each targeted codec.

Although the present invention has been primarily developed for the audio realm, its methodology can be extended into the image and video realms. The main difference between a Fourier spectrogram for audio and one for an image is that the audio is one-dimensional and the image is two-dimensional. Video is a series of images coupled with audio so techniques that work for audio and images will, by extension, also work for video with or without audio. Another difference is that the mathematical model is psycho-visual instead of psychoacoustic. The principles, however, are the same.

In addition, the present invention can further include extending the information-encoding methods to increase the bitrate for embedded steganographic information. There are several standard ways of doing this and the scope of the present invention is broad enough to also include any newly discovered methods to increase the bitrate.

The present invention can be incorporated into a computer product that contains computer readable program code means to effect creating a digital differential steganographic watermark for an unmarked media. The computer product may be installed on stand-alone computers, a server of a local area network, computer workstations connected to a local area network, or a server connected to the Internet. The computer product may be supplied on any computer usable medium or downloadable over the Internet.

DETAILED DESCRIPTION OF THE PREFERRED EMBODIMENT

Figure 1:
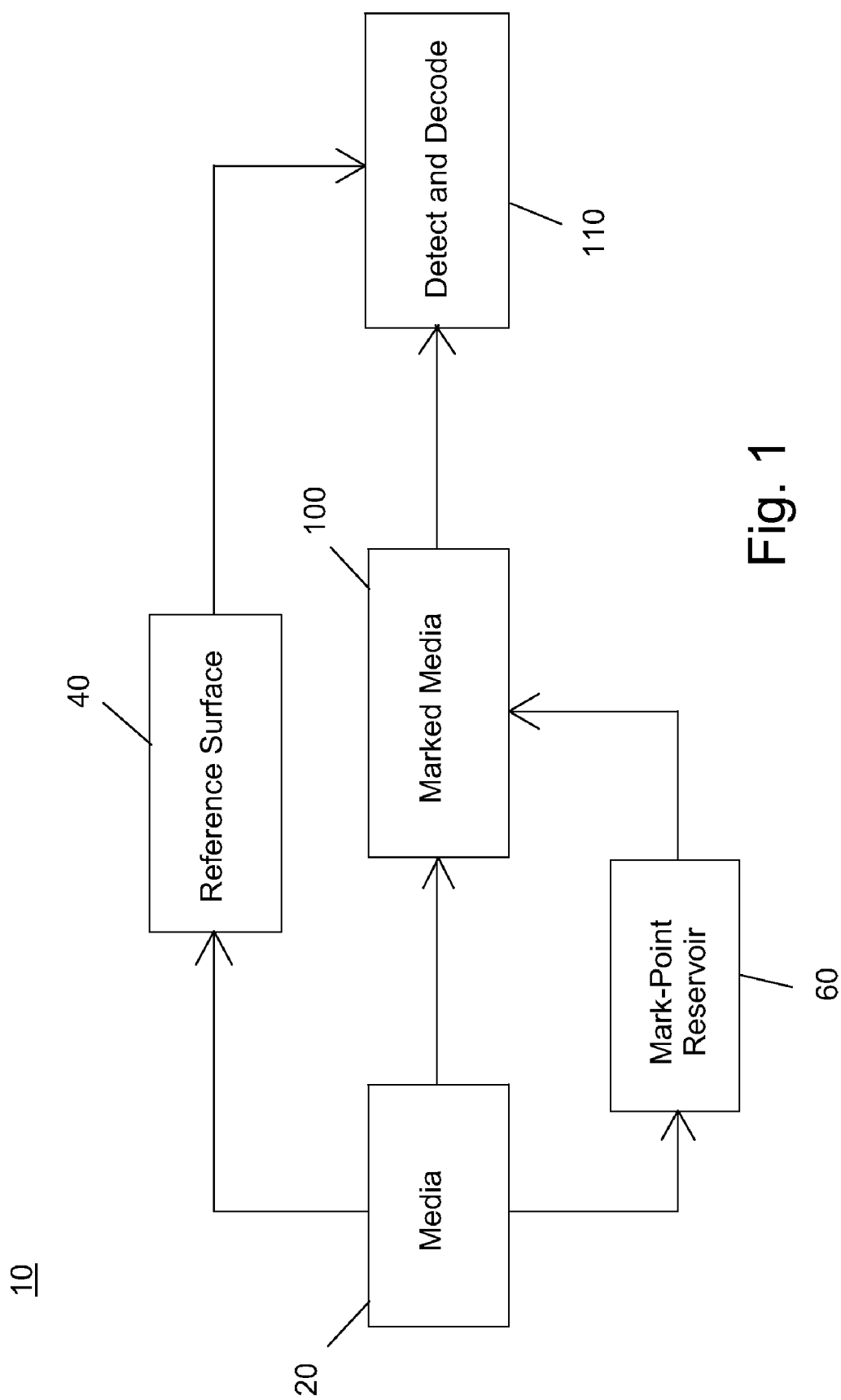
FIG. 1 is a block diagram showing an overview of the present invention.

The preferred embodiment of the present invention is illustrated in FIGS. 1-5. FIG. 1 shows a block diagram of an overview of the differential digital watermarking system 10 of the present invention. Differential digital watermarking system 10 includes an original, unmarked media 20, a reference media/surface that acts as a master key 40 for the unmarked media 20, and a mark-point reservoir 60. The unmarked media 20 is then embedded with pre-determined data into marks in media 20 that have been selected from mark-point reservoir 60 to form marked media 100. Marked media 100 may then be authenticated by the detect and decode process 110. Detect and decode process 110 compares the reference media/surface 20 to the marked media 100 and the difference is verified against the original mark-point embedded data.

This process will now be more clearly described.

Preparation

Figure 2:
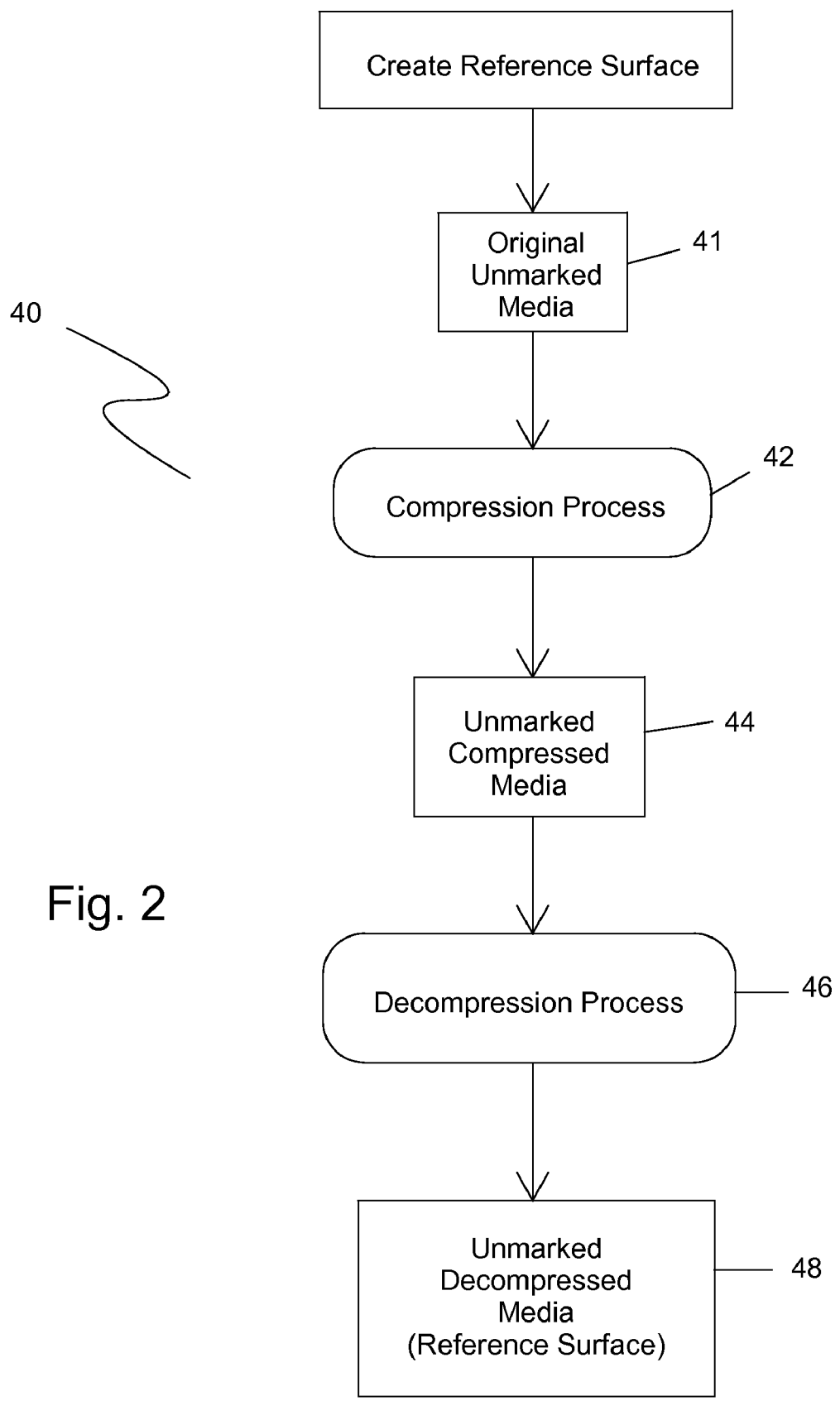
FIG. 2 is an illustration showing the preparation of the reference media.

Differential digital watermarking system 10 requires the creation of a reference media 20 to account for incidental distortion of the encoding mechanism as illustrated in FIG. 1. Creation of reference media is illustrated in FIG. 2. Turning now to FIG. 2, the process to create the reference media is described. An original, unmarked media 20 is selected at step 41. The media is subjected to a compression process at step 42 to produce an unmarked compressed media at step 44. The unmarked compressed media is then subjected to a decompression process at step 46. This step basically eliminates those mark points that are not capable of surviving the compression/decompression process and provides an unmarked decompressed media as the reference surface or master key 40 at step 48. This media may be null for some encoding methods.

Figure 3:
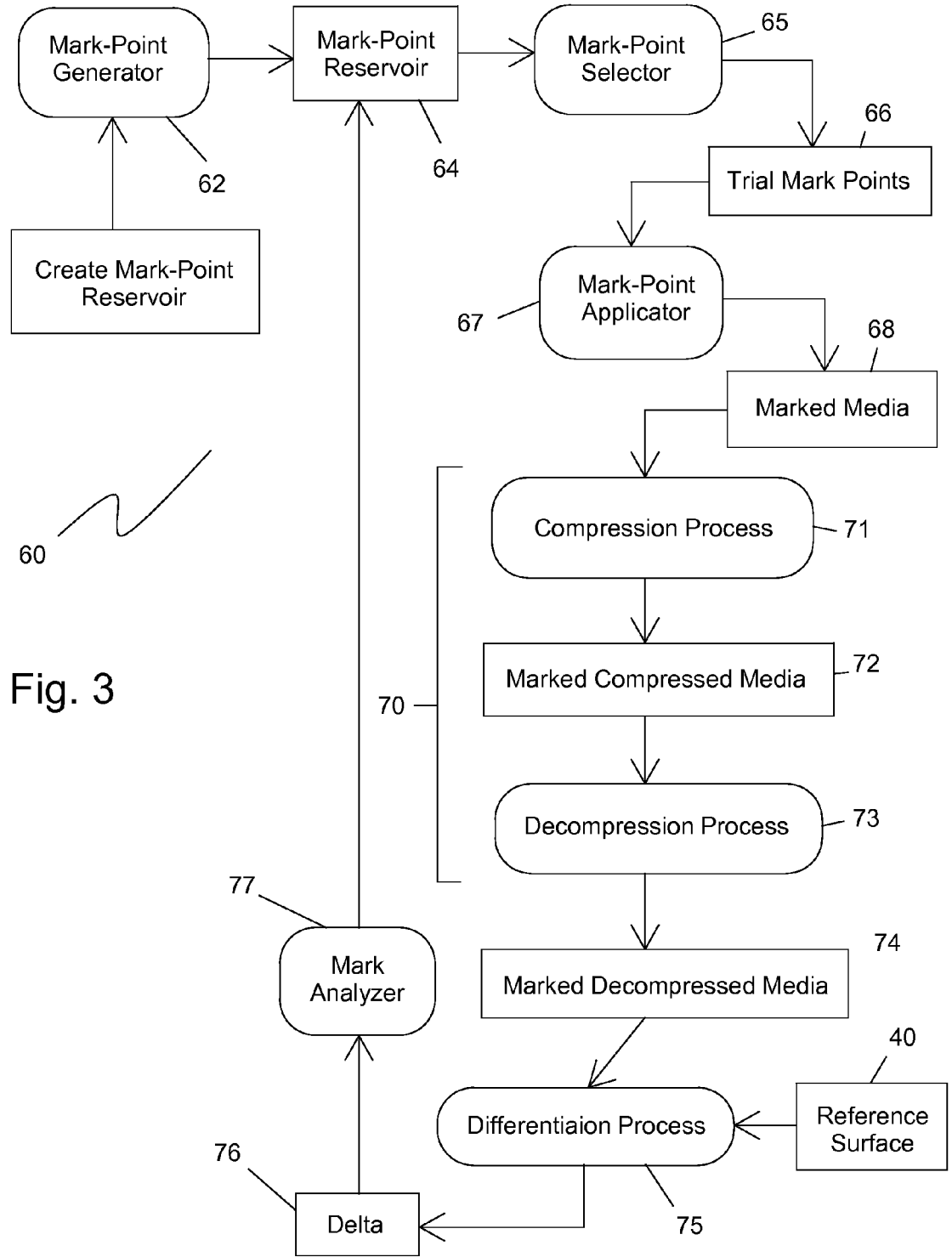
FIG. 3 is an illustration showing the creation of a mark-point reservoir.

System 10 also requires the generation of a set of candidate marks based on peak-frequency or other appropriate analysis of target media forming mark-point reservoir 60, which process is illustrated in FIG. 3. At step 62, a mark-point generator creates a mark-point reservoir 60 shown at step 64. A mark-point selector module 65 selects a plurality of trial mark points 66, which is supplied to the mark-point applicator module 67. Mark-point applicator module 67 applies the selected trial mark points 66 to the target media to form marked media 68. Marked media 68 is subjected to the compression and decompression module 70 that includes a compression process 71 generating a marked compressed media 72, which is subsequently subjected to a decompression process 73 to form a marked decompressed media 74. Marked decompressed media 74 is then subjected to a differentiation module 75, which compares the marked decompressed media 74 to the reference media 40. A differential or "delta" media list 76 of trial marks that have survived the compression/decompression cycle is created. The delta list 76 is then subjected to a mark analyzer module 77, which processes the delta list 76 to determine those mark-points containing trial mark points that have survived the compression/decompression process. The mark-point reservoir 64 is then updated with the information regarding those mark points that have survived the compression/decompression process.

Figure 4:
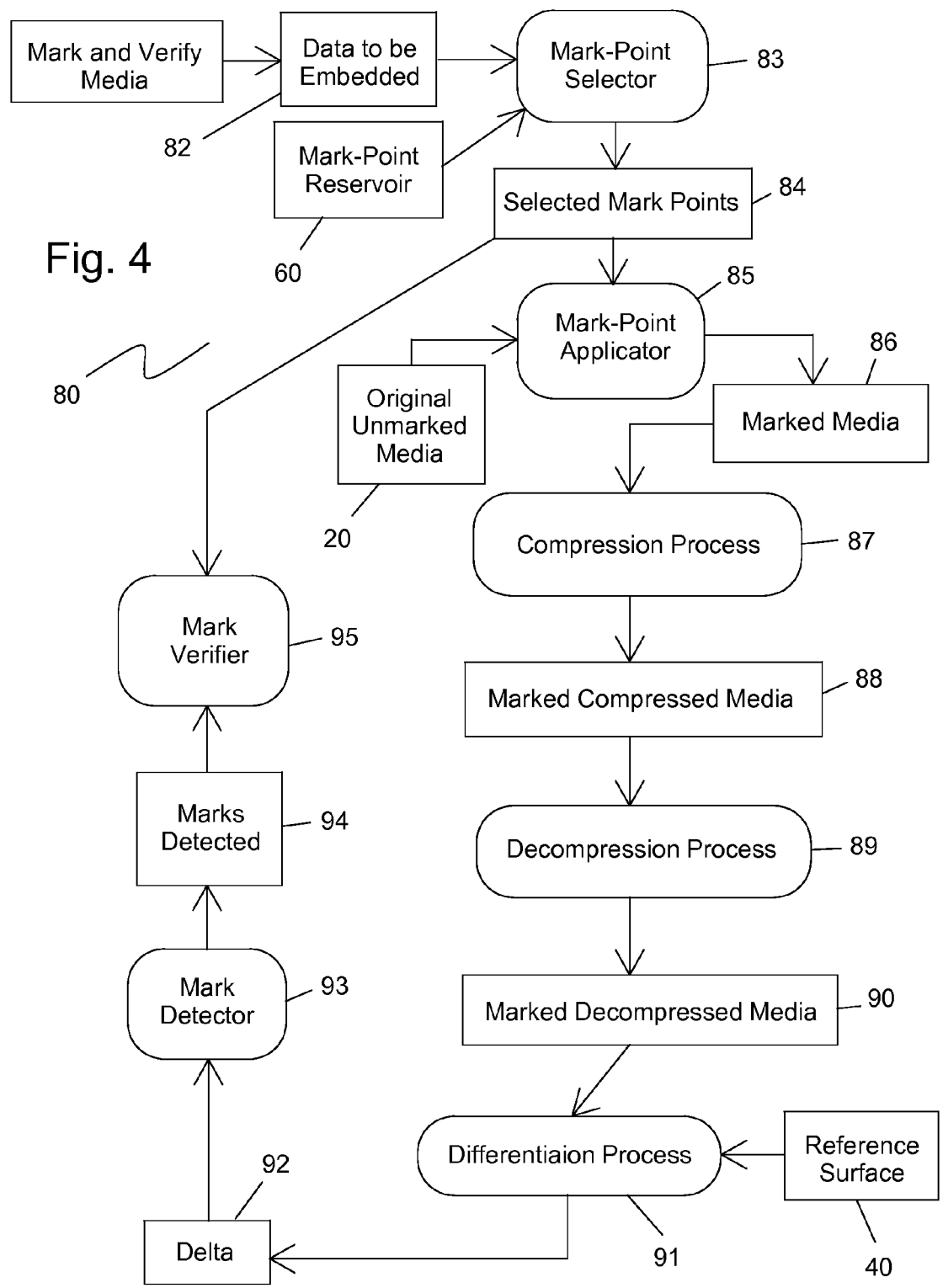
FIG. 4 is an illustration showing the marking and verification of the media.

Once the set of candidate marks is generated, the set is tested and verified in the target media for predictable distortion patterns and non-interference. A mark verifier module 80 includes a mark verification process for the selected media, which is illustrated in FIG. 4. Data to be embedded 82 and the mark-point reservoir 60 created in the process described in FIG. 3 are supplied to a mark-point selector 83. Mark-point selector 83 selects the mark points (i.e., the locations in the media) from the mark-point reservoir 60 created from the particular media and couples the data 82 to those selected locations for embedding the data creating selected mark points 84. The selected mark points 84 and an original unmarked media 20 are provided to the mark-point application 85 to generate the marked media 86. Marked media 86 is then subjected to the compression process 87 forming the marked compressed media 88, which is then subjected to a decompression process 89 generating the marked decompressed media 90. The marked decompressed media 90 is then compared to the reference surface 40 using a differentiation process 91. The difference or delta 92 is then subjected to a mark detector process 93, which in turn generates a list of detected marks 94. The detected marks 94 are then subjected to a mark verifier process 95 of mark verifier module 80 which compares the detected marks 94 to the selected mark points 84.

In addition, one must ensure that the test marks are sufficiently distant from each other. This may be difficult in some encoding methods such as variable-bit-rate methods, and may require the use of a 'stop' mark or other adjustment techniques in some cases. After being subjected to the mark and verify process of mark verifier module 80, viable marks are collected in a mark-point reservoir 60. The test-and-verify method selects marks for testing at sufficient distances to ensure non-interference (marks tested and verified in isolation), and repeating the process until all marks have been tested or enough viable marks have been found to support the desired encoding bandwidth (the bits per second that may be embedded in the underlying media). Viability criteria will vary with the compression mechanism being used. For example, in an implementation for mp3 compression with a fixed bit-rate, a mark is considered viable if it produces an inaudible distortion pattern whose effect is limited to a particular finite area and time frame. This distortion may be referred to as the "splash" produced by the mark.

As previously explained, it was discovered that the splashes/marks fell into one of five categories; (1) fragile, (2) robust, (3) reinforcing, (4) interfering, or (5) destructively degrading. If the objective is not only the survivability of the "watermark" (i.e. the embedded data) but also to frustrate methods of removing the "watermark" from the media, then it was found that using all or mostly "destructively degrading" splashes/marks would render the media useless. This, in effect, would make the "watermarked" media be more resistant to attack since any attempt to remove the embedded data or alter the embedded data will damage the media.

Select Marks from Reservoir

Given some data to be embedded into some target media, the data is converted into a mark-pattern representation. The process was previously explained and illustrated in FIG. 4 and may be done various ways. For example, in a prototype implementation, the simplest possible audio "dot" as a mark was used, e.g. altering the power, magnitude, and/or phase of a single frequency bin at a particular time segment in the audio. It should be understood that more sophisticated mark-points are possible, are likely to yield better performance, and may be found using mathematical prediction techniques rather than test-and-verify exploration. Furthermore, the reservoir of potential marks may be larger than the minimum number of mark-points necessary to achieve a certain bit rate for the embedded data-stream. This allows the marking method to choose randomly among suitable mark points so that the method is more resilient to certain forms of attack such as combining multiple files with the same embedded data.

As illustrated in FIG. 4, the marks are selected from the mark-point reservoir 60 and organized to encode the given data using some representational scheme. Many schemes are possible. The prototype example uses the simplest of these. The audio is subdivided into a series of cells, and the number and size of marks in each cell is used to represent a zero, a one, or a 'stop' delimiter token, based on the number of 'splashes' that appear in each cell. Note that a cell with no marks is empty and represents no data, hence the need for a 'stop' token in this simple representational scheme.

Apply Marks

Once the selected marks are determined, the marks are applied to the original media by altering the media at the specified point in the manner designated by each individual mark. This process was illustrated in FIG. 4. Many types of marks are possible, with each type specifying a different pattern of alteration. Once embedded with the selected marks and data, the marked media is run through a compression encoder to produce a marked compressed media as output.

Detect and Decode

Figure 5:
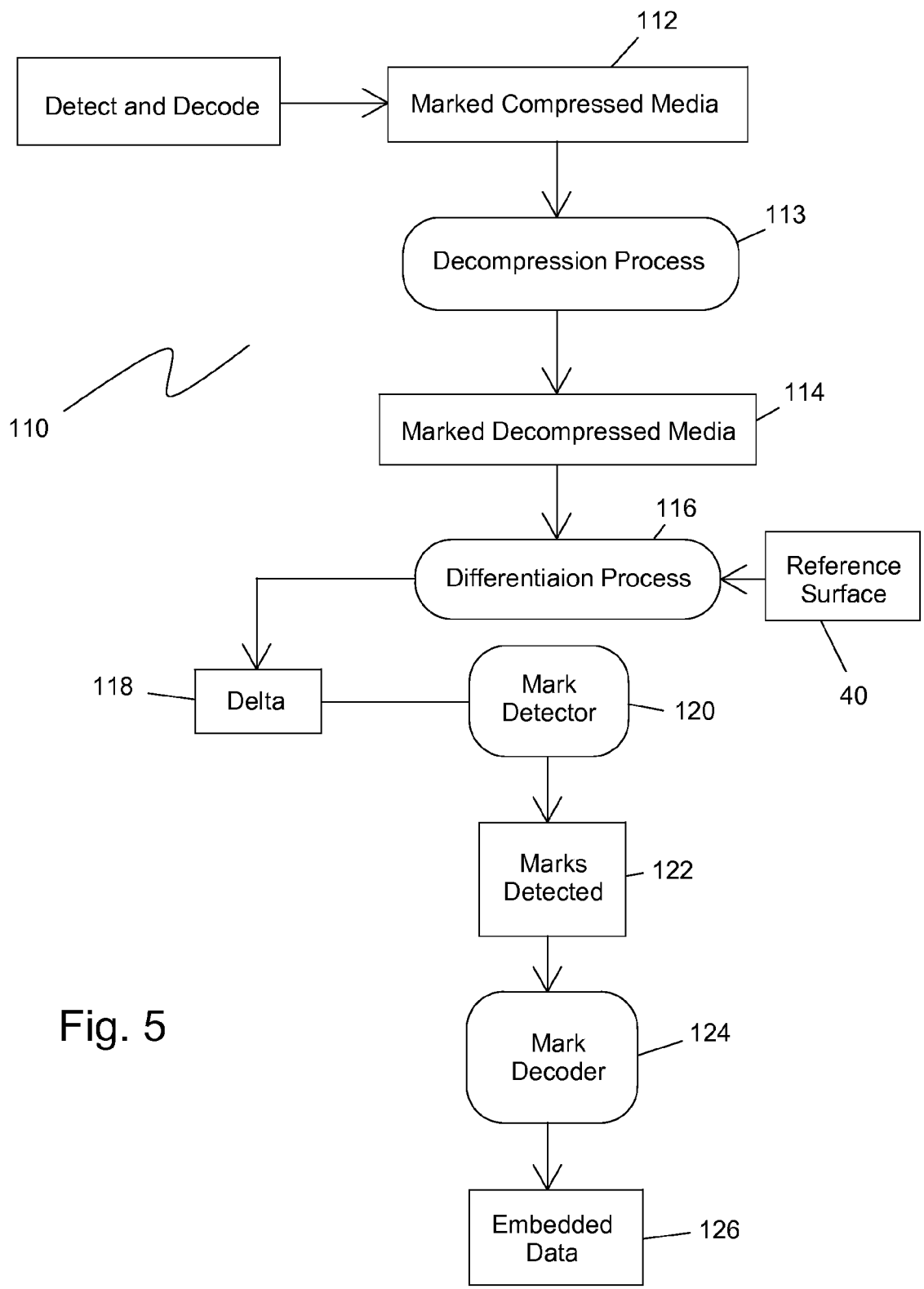
FIG. 5 is an illustration showing the detecting and decoding process of the present invention.

Turning now to FIG. 5, there is illustrated the detect and decode module 100, which contains a process to detect and decode the embedded date in a marked media. Prior to this step, a specific media 20 was selected and a reference surface or master key 40 for the specific media 20 was generated. In addition, a mark-point reservoir 60 was also generated for the specific media 20. Data to be embedded was embedded into mark points selected from the mark-point reservoir 60 for the specific media 20 to create a marked media 100. Marked media 100 contains the embedded data or "watermark."

Detect Marks

After obtaining the marked compressed media 112, the marked media is run through the compression and decompression module 70, which may be a lossy-compression decoder (a decompression process 113) to produce a marked decompressed media 114. The marked decompressed media 114 is subjected to a differentiation process 116 of differentiation module 75 that differentiates the marked decompressed media 114 from the reference media 40 created above to produce a "delta" media 118. The "delta" media 118 is scanned using a mark detector process 120, which is part of the mark detector module to identify the detected marks 122 (the distortion pattern "splashes") caused by the marks.

Decode Marks

The identified distortion pattern "splashes" (the detected marks 122) are converted (i.e. subjected to a mark decoder process 124) into data (the embedded data 126) using the representation scheme, i.e. the selected mark-points chosen from the mark-points reservoir discussed above.

Implementation

To test the viability of the present invention, the simplest choices for mark types, encoded-data representation, and test media were selected for implementation of the present invention. All of these items may vary without affecting the effectiveness of the method.

EXAMPLE 1

Mp3 files were encoded at 128 bits per second as the lossy-compression media format, and WAV files with 16-bit integer samples at 44.1 KHz as the uncompressed media format. The LAME mp3 encoder version 3.92 MMX was used to compress and decompress the test files. The system was tested with noise reference files, one 30-second music audio file, and one 90-second music audio file. Typical encoding rates were in the range of 4-5 bits per second. Eight-bit alphanumeric encoding was used to represent the target data to be embedded, which was a character string provided as input.

Marks are constructed by altering the magnitude and/or phase of a frequency bin in a representation of the audio spectrum produced by a Fast Fourier Transform (FFT) operation. The FFTW library was used for FFT functions. The FFTW library used in this example was obtained at that time from http://www.fftw.org/. It should be noted that the method is independent of the FFT library used. In fact, alternate frequency-analysis techniques such as the Discrete Cosine Transform (DCT) may be substituted without altering the method.

Visualizing the marks and splashes as 3D surfaces was essential during development, and was implemented using the Allegro 3D drawing library. This library was obtained at that time from http://alleg.sourceforge.net/.

The overall process was constructed using Perl scripts to call custom C++ programs on a personal computer running the Windows operating system.

It should be understood that the construction of the reservoir does not exhaust all possible marks, but uses a representative sample of the possible mark types and locations. This process is expensive and could be optimized (other than incorporating hardware as the optimizing solution) by (a) exploiting the lossy-encoding mechanism's mathematical model to generate more likely mark locations, and to construct more effective and efficient marks, (b) performing the mapping process in-line in the main encoder loop with rollback capabilities, so that individual marks may be tested in isolation in a single pass through the media file, without having to process the entire file for a set of candidate marks, or (c) a combination of options (a) and (b) supported by analysis of existing viable marks.

It should also be noted that there is a precision-conversion issue which limits mark accuracy and reproduction quality in the implementation. The targeted output is integer-based, while mark processing uses floating-point numbers. Thus, precise marks constructed in the floating-point realm acquire slight distortions in the conversion to the integer-based output file format. This doesn't prevent the technique from working, it is just an issue of the targeted domain that could be improved. This effect tends to make the splashes larger than they would be if numeric accuracy was preserved.

It should also be understood that construction of the mark points is overly simplified, i.e. adding or subtracting a small amount from the magnitude and/or phase of the peak frequency band in a small area of the target media. This minimal impulse waveform is the simplest possible waveform shape for a mark and that more complex waveform shapes may be used to improve mark robustness. Knowledge of the mathematical model of the lossy-compression encoder could be used to fine-tune marks for more precise location, smaller splash areas, and less interference. This allows marks to be combined or overlaid for more complex representation schemes for the embedded data, yielding higher bandwidth for the embedded data.

Decoding and recoding with a different lossy-compression method may destroy the marks in some cases. In general, a higher-fidelity compression method will tend to preserve the marks relatively intact, while a lower-fidelity compression method will tend to amplify the mark's distortion, degrading the quality of the media data. This can vary based on other factors, for example, a file compressed using a fixed bit-rate (such as 128 bits per second) that is decompressed and recompressed using a variable bit-rate may produce less predictable results. Depending on the available bit-rate at a given point in the media file, the mark splash distortion may be preserved or amplified or removed. The effects of this operation are mathematically predictable for a given lossy-compression method, so mark recognition may still be possible in some cases. This area does not alter the effectiveness of the present invention, but it does offer an area for further improvement.

Applications

The digital differential watermark is applicable as a general steganographic method for any lossy-compression media with deterministic encoding. Deterministic encoding means that when a particular input is provided to the lossy-compression encoder a certain output is obtained. In other words, repeating the process with the same input, will always produce the same output. Two applications in particular are illustrative. In one type of application, a transaction identifier is inserted into a digital media file at the point of distribution or sale. This application would provide accountability and tracking of digital media. In another type of application, passcode information is hidden in a watermark in a biometric sample media file such as, for example, a voice recording or face image, and a live sample as the key is used. It is noted that a rotating code could be embedded in each new sample, providing the ability to keep the live sample 'key' updated. This type of application provides convenient security authentication.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A method of digital differential steganography for embedding steganographic data in a digital digital media file comprising:

providing an original uncompressed digital media aerie file to a processor;

generating, at the processor, a master key by (i) subjecting the original uncompressed digital media file to a lossy compression process to create an unmarked compressed digital media file, and (ii) subjecting the unmarked compressed audio file to a decompression process to create an unmarked decompressed digital media file for use as the master key;

identifying, at the processor, a set of candidate mark-points on the original uncompressed digital media file by (i) generating a mark-point reservoir that identifies a set of trial mark-points on the original uncompressed digital media file, (ii) marking the original uncompressed audio file with a set of trial marks at the set of the trial mark-points selected from the mark-point reservoir to create a marked digital media file, (iii) subjecting the marked digital media file to the lossy compression process to create a marked compressed digital media file, (iv) subjecting the marked compressed digital media file to the decompression process to create a marked decompressed digital media file, (v) identifying the set of candidate mark-points from the set of trial mark-points as the trial marks on the decompressed digital media file that have survived the lossy compression process and the decompression process, and (vi) updating the mark-point reservoir to include only the set of candidate mark-points; and generating, at the processor, a watermarked digital media file by: (i) embedding steganographic data at the set of candidate mark-points on the original uncompressed digital media file to create a watermarked uncompressed digital media file; (ii) subjecting the watermarked uncompressed digital media file to the lossy compression process to create a watermarked compressed digital media file, and (ii) subjecting the watermarked compressed media file to the decompression process to create the watermarked digital media file;

wherein the steganographic data can be extracted from the watermarked digital media file using the master key.

2. The method of claim 1 wherein the set of trial mark-points are identified as frequency peaks of a waveform representing a digital media spectrum of the digital media file.

3. The method of claim 1 wherein embedding steganographic data at the set of candidate mark-points on the original uncompressed digital media file includes altering one of magnitude and phase in a representation of a digital media spectrum of the digital media audio file.

4. The method of claim 1:
wherein the each of the set of candidate mark-points, when marked, subjected to the lossy compression process, and subjected to the decompression process creates a watermark categorized as one of destructively degrading and non-destructively degrading;
wherein attempting to remove a destructively degrading watermark from a destructively degrading candidate mark-point of the watermarked digital media file renders the watermarked digital media audio file unusable;
wherein attempting to remove a non-destructively degrading watermark from a non-destructively degrading candidate mark-point of the watermarked audio does not render the watermarked digital media file unusable; and
wherein embedding the steganographic data at the set of candidate mark-points on the original uncompressed digital media file to create the watermarked uncompressed digital media file includes embedding the steganographic data substantially only at destructively degrading candidate mark-points.

5. A computer system supporting digital differential steganography for embedding steganographic data in a digital media file, the computer system including:
a processor;
a memory unit that stores instructions associated with an application executed by the processor; and
an interconnect coupling the processor and the memory unit, enabling the computer system to execute the application and perform operations of:
providing an original uncompressed digital media file,
generating a master key by (i) subjecting the original uncompressed digital media file to a lossy compression process to create an unmarked compressed digital media file, and (ii) subjecting the unmarked compressed digital media file to a decompression process to create an unmarked decompressed digital media file for use as the master key,
identifying a set of candidate mark-points on the original uncompressed digital media file by (i) generating a mark-point reservoir that identifies a set of trial mark-points on the original uncompressed digital media file, (ii) marking the original uncompressed file with a set of trial marks at the set of trial mark-points selected from the mark-point reservoir to create a marked digital media file, (iii) subjecting the marked digital media file to the lossy compression process to create a marked compressed digital media file, (iv) subjecting the marked compressed digital media file to the decompression process to create a marked decompressed digital media file, (v) identifying the set of
candidate mark-points from the set of trial mark-points as the trial marks on the decompressed digital media file that have survived the lossy compression process and the decompression process, and (vi) updating the mark-point reservoir to include only the set of candidate mark-points, and
generating a watermarked digital media file by: (i) embedding steganographic data at the set of candidate mark-points on the original uncompressed digital media file to create a watermarked uncompressed digital media file; (ii) subjecting the watermarked uncompressed digital media file to the lossy compression process to create a watermarked compressed digital media file, and (ii) subjecting the watermarked compressed digital media file to the decompression process to create the watermarked digital media file, wherein the steganographic data can be extracted from the watermarked digital media file using the master key.

6. The computer system of claim 5 wherein the set of trial mark-points are identified as frequency peaks of a waveform representing an digital media spectrum of the digital media file.

7. The computer system of claim 5 wherein embedding steganographic data at the set of candidate mark-points on the original uncompressed digital media file includes altering one of magnitude and phase in a representation of a digital media spectrum of the digital media file.

8. The computer system of claim 5:
wherein the each of the set of candidate mark-points, when marked, subjected to the lossy compression process, and subjected to the decompression process creates a watermark categorized as one of destructively degrading and non-destructively degrading;
wherein attempting to remove a destructively degrading watermark from a destructively degrading candidate mark-point of the watermarked digital media file renders the watermarked digital media file unusable;
wherein attempting to remove a non-destructively degrading watermark from a non-destructively degrading candidate mark-point of the watermarked does not render the watermarked digital media file unusable; and
wherein embedding the steganographic data at the set of candidate mark-points on the original uncompressed digital media file to create the watermarked uncompressed file includes embedding the steganographic data substantially only at destructively degrading.

* * * * *